Sept. 30, 1941.    C. N. BATSEL    2,257,560
SOUND FILM BLOOPING APPARATUS
Filed Jan. 28, 1938
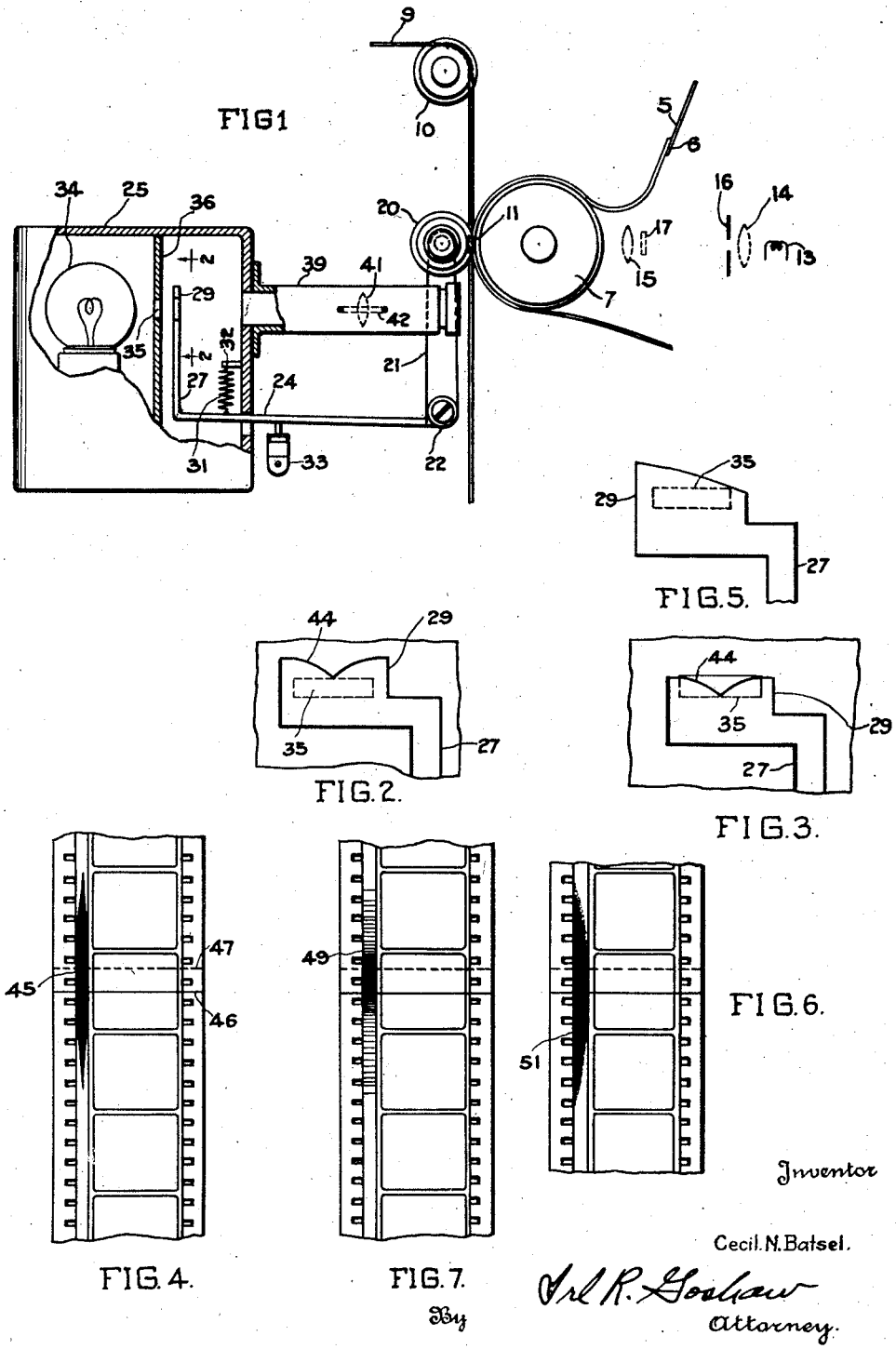
Inventor
Cecil. N. Batsel.
By Orl R. Goshaw
Attorney.

Patented Sept. 30, 1941

2,257,560

UNITED STATES PATENT OFFICE 2,257,560

SOUND FILM BLOOPING APPARATUS

Cecil N. Batsel, Los Angeles, Calif., assignor to Radio Corporation of America, a corporation of Delaware Application January 28, 1938, Serial No. 187,443

4 Claims. (Cl. 95—75)

This invention relates to talking motion picture film apparatus and particularly to such apparatus commonly known as "blooping devices" whereby the sound track portion of talking motion picture film is light-impressed in such a manner as to eliminate irregularities therein which would otherwise cause clicks or deleterious noises during the reproduction of the film. For the purpose of this application a "bloop" is considered as the modification to, or the change produced in, the sound track portion of a film which when reproduced will produce a substantially inaudible sound.

The principal object of the invention is to prevent extraneous noises from being reproduced by the sound system during the projection of a motion picture.

Another object of the invention is to eliminate, in the sound track portion of a positive film, the variations in opacities occurring at the corresponding point in the negative film caused by the splicing thereof or other foreign variations.

A further object of the invention is to vary the light transmission of a film from transparency to opacity and vice versa without producing an audible sound when reproduced.

A further object of the invention is to automatically control and vary the form and/or intensity of the light impressed on the sound track portion of a film by variations in film thickness, such as caused by splices in the film, the operating energy for producing the variations in intensity being derived solely from the movement of the film.

A further object of the invention is to provide a blooping device adjustable for either variable area or variable density bloops or a combination thereof, and also adjustable as to length of the bloops.

It is well known in the motion picture art that different sequences of the picture and sound track are taken on separate strips of film, these strips being eventually spliced together to form continuous negative reels of approximately a thousand or two thousand feet each, the various sequences being of different lengths from one foot to several hundred feet. To produce the final print this negative of spliced negative strips is passed through a printer in synchronism with positive raw stock either in contact or in optical relation to one another. Ordinarily the splices would show up on the final print as opaque, transparent, or uneven lines or blurs, which would cause the clicks and noises mentioned above.

The broad problem of the invention has been already realized in the art as evidenced by U. S. Patent No. 1,896,682, of February 7, 1933, wherein are disclosed fogging lamp and shutter types of blooping devices. Other methods of producing substantial silence at the splice points are also known, such as the cutting out of the film or the gluing on of opaque triangular or trapezoidal patches at the splice points. The present invention, however, is directed to a fogging or shutter type device and is an attachment for a printer of motion picture film. It utilizes an auxiliary light source of constant intensity and a shutter mask to prevent light from fogging the film except at the splice points. The shutter is controlled by variations in the thickness of the film such as an increase in thickness caused by the overlapping splice. That is, a film traveler such as a roller is moved when a splice passes thereunder, thus actuating the shutter which permits light to strike the film. Two forms of the shutter are disclosed which, together with the optical system, produce different shapes of bloops and different variations in film track opacities on the final print at the splice points.

Although the novel features which are believed to be characteristic of this invention will be pointed out with particularity in the claims appending herewith, the invention itself, its objects and advantages, the manner of its organization and the mode of its operation will be better understood by referring to the following description read in conjunction with the accompanying drawing forming a part thereof, in which—

Figure 1 is a cross-sectional view of the blooping apparatus schematically applied to a film printer;

Figures 2 and 3 show the two extreme positions of one form of shutter taken along the line 2—2 of Fig. 1;

Figure 4 is an illustration of one form of bloop which may be made by the shutter of Figs. 2 and 3;

Figure 5 shows another form of shutter which may be used in the apparatus of Fig. 1;

Figure 6 shows one form of bloop which may be made by the shutter of Fig. 5; and Figure 7 shows another form of bloop which may be made with either the shutter of Figs. 2 or 3 or the shutter of Fig. 5.

Referring now to the drawing in detail, in Fig.

1 a negative film 5, which may be composed of different length strips spliced together, one splice being shown at 6, is passed over a roller 7. A positive film 9 may pass over a roller 10 of a printer (not shown) and contact the negative 5 at a point 11 on the roller 7, to which printing light from a lamp represented by the filament 13, may be passed through lenses 14 and 15, a slit mask 16 and an ultra-violet filter 17, if desired. For printing purposes, the negative and positive films may be held in contact on the roller 7 in any suitable manner, but for the purpose of the blooping operation, they are passed between the roller 7 and a roller 20.

Roller 20 is mounted on a lever 21 pivoted at 22, the lever 21 having a right-angle portion 24 extending into a light house 25. Within the light house 25, the lever 24 has an extension 27, at the end of which a mask shutter 29 is positioned. This shutter may have a curved V-type shape as shown in Figs. 2 and 3, or may be of the single curved form as shown in Fig. 5. Although one particular lever system 21, 22, 24 and 27 is shown, it is to be understood that other types of mechanical linkages between the roller 20 and the mask 29 are within the scope of this invention, and may be employed to provide any desired multiplying factor. That is, for a movement of the roller 20 amounting to the thickness of the film, the mask shutter 29 will move a distance, depending on the leverage factor therebetween. It is also to be understood that this system may operate as an impact or impulse device wherein the roller 20 may move a greater distance than the thickness of the film when the movement of the roller is actuated by the splice contacting the roller 20.

To maintain the roller 20 tightly against the film, a tension spring 31, connected between the point 32 on the housing 25 and to the lever arm 24, is employed. To control the timing of the mask 29 a dashpot arrangement 33 is employed. Thus, different speeds of movement of the shutter 29 across the light beam may be obtained by this mechanical filter arrangement formed by the dashpot 33 and spring 31.

Referring now to the light house 25 there is enclosed therein a constant solurce of light rays in the form of a lamp 34, a light beam therefrom being defined by a slit 35 in a wall 36 of the lamp house. The light passing the slit 35 is transmitted through a light tube 39 to the positive film 9 slightly below the printing point 11. It is obvious, of course, that the blooping point may also be at the roller 7 or before or after the printing point 11 but it must bear the proper relation to the positioning of the roller 20 in order to light-impress the positive at the points corresponding to the splices in the negative. Within the tube 39 is a lens 41 which may be mounted in a holder slidable in a groove 42 for focusing the slit 35 or mask 29 on the film or for producing an out-of-focus condition so that the mask 29 operates as an iris to vary the intensity of the light striking the film.

As shown in Figs. 2 and 3, the mask 29 has a curved V-type notch 44 cut in the upper portion thereof, and in normal position the apex of the notch is just above the upper edge of the light slit 35 to obstruct all the light through the slit from reaching the positive film 9 as shown in Fig. 2. The other extreme position of the notch 44 with respect to the slit 35 is shown in Fig. 3, wherein the upper edge of the mask 29 just clears the upper edge of the slit. Greater limits of travel may be had depending on the mechanical leverage factor between the roller 20 and the mask 29.

Now to produce the type of bloop 45 shown in Fig. 4, the lens 41 is so positioned as to focus an image of the notch 44 on the film and as the mask goes through a cycle of oscillation, the light will reach the film first through the apex of the notch and then over its full width. Then, as the mask returns to normal, the light variation will be reversed and a bloop will be formed as shown in Fig. 4. Although the bloop is produced on a positive which has no splice therein, the lines 46 and 47 of the ends of the negative strips are shown on the film in Fig. 4 to show the relative position of the bloop with respect to the splice point.

Now the lens 41 may be so adjusted to allow the mask to act as an iris and always permit light to reach the film over the entire transverse width of the sound track regardless of the intermediate positions of the mask. The various positions of the mask, however, will control the quanta or intensity of the light reaching the film and will produce the form of bloop shown at 49 in Fig. 7. This bloop is of the variable density type which goes from transparency at both ends and is graduated in opacities to the center point. The relative splice ends of the negative are also shown relative to the bloop for purposes of illustration.

In Fig. 5 the form of mask illustrated is tapered in only one direction across the entire slit 35 and will, therefore, produce a V or trapezoidal type of bloop 51 as shown in Fig. 6. The setting of the lens 41 to produce this type of slit is, of course, such that the mask 29' is focused on the film so that light passes across the sound track portion of the film from edge to edge. A bloop of the type shown in Fig. 7, however, can be produced by an out-of-focus condition, as in the case of the mask form shown in Figs. 2 and 3.

The present blooping arrangement also lends itself to production of a combination variable density-variable area type of bloop. This is accomplished by placing the mask 29 slightly out-of-focus, and a feathered or graduated edge type of bloop 51 is the result. That is, the bloop 51 could have sharp edges as shown by the bloop 45, or be of the varying density type as shown in Fig. 6. Similarly the bloop 45 could be produced having a variable density edge as shown by bloop 51. It has been found in practice that the combination type of bloop—that is, one of the variable area-variable density type, such as shown in Fig. 6 at 51—is more silent in operation than one solely variable area or variable density, as shown in Figs. 4 and 7, respectively.

The above blooping device as illustrated in Fig. 1 is particularly adapted to printing devices and can be operated so that the roller 20 has to move only the thickness of the film to produce sufficient movement by the mask 29, or may be of the impact or impulse type, where the roller is deflected a greater distance than the thickness of the film. Furthermore, by adjusting the tension of the spring 31 and the reaction of the dashpot 33, the lengths of the bloops are controlled. As shown in Figs. 4, 6 and 7, the bloops are substantially three frames long but this length could be shortened or lengthened to any desired size by the dashpot and spring adjustments. These elements also control the general shape of the bloops as well as the lengths thereof; that is, the length of the tapered portions with respect to the full-width portions.

I claim as my invention:

1. Motion picture apparatus for light impressing a motion picture film at predetermined points thereon for a predetermined interval of time, the points of light impression being determined by the passage of film splices past a point on said apparatus, comprising a source of light rays, means for defining said light rays into a light beam of certain dimensions, means for shuttering said light beam from said film, means connected to said shuttering means and actuated by said splices for controlling the points of impression of said light rays on said film, and means connected to said last-mentioned means for controlling the period of impression of said film by said light rays.

2. Motion picture apparatus in accordance with claim 1 in which said last-mentioned means are adjustable for varying the rate of impression of said light rays on said film and the rate of elimination of said light rays from said film.

3. Motion picture apparatus comprising means for passing a plurality of films between a fixed roller and a movable roller, a source of light, shuttering means positioned between said source of light and one of said films, said means being connected to said movable roller, means connected to said last-mentioned means for determining the rate of variation of said shuttering means during movement of said roller by splices in at least one of said films passing between said rollers, and means interposed between said light means and said film for varying the form and shape of the rays projected to said film.

4. Motion picture apparatus in accordance with claim 3 in which means are provided for projecting a light penumbra of said shuttering means on said film, said means being adjustable to project an image of said shuttering means on said film.

CECIL N. BATSEL.